May 26, 1942.  L. J. CASTELLANOS  2,284,260
METHOD OF MAKING SEALING SUPPORTS FOR TOOL JOINTS
Filed Nov. 15, 1940
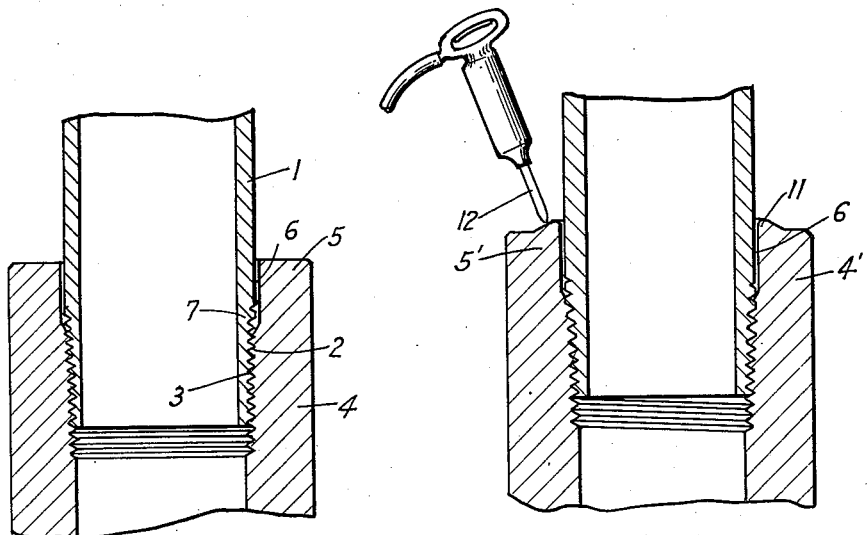
Fig. 1
Fig. 3
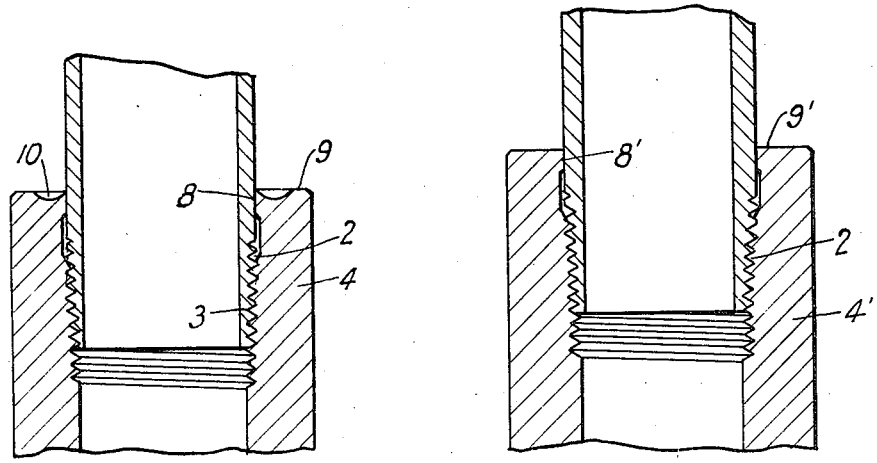
Fig. 2
Fig. 4
Leopold J. Castellanos
INVENTOR.
BY Jesse R. Stone
ATTORNEYS.

Patented May 26, 1942

2,284,260

UNITED STATES PATENT OFFICE 2,284,260

METHOD OF MAKING SEALING SUPPORTS FOR TOOL JOINTS

Leopold J. Castellanos, Houston, Tex., assignor to Hughes Tool Company, Houston, Tex., a corporation of Delaware Application November 15, 1940, Serial No. 365,729

1 Claim. (Cl. 29—148.2)

My invention relates to a method of making tool joints employed in connecting together sections of drill pipe in well drilling.

A difficulty which is commonly encountered in the construction of drill stems is that the lateral flexing and bending of the drill stem in use tends to cause fatigue strain in the metal of the pipe at the threaded connection and more particularly at the last engaged thread of said connection. When the pipe end is screwed tightly into the tapered socket a strong compressive strain upon the pipe end by the joint develops. The drill stem is liable to crack or break along the line of the last engaged thread due to the fact that the compressive strain of the joint upon the pipe terminates at the last thread. The lateral flexing of the pipe tends to cause fatigue and fracture at this point.

It is an object of my invention to provide a support for the end of the joint member against the pipe at a point spaced from the threaded area so that the flexing of the pipe will not be communicated to the threaded area.

I desire to upset or peen the metal of the joint member inwardly against the pipe so as to exert a compressive strain from the joint to the pipe at that area and thus avoid lateral strains and stresses upon the threaded portion. I desire to bring the metal at the end of the joint member into close sealing engagement with the pipe at a point spaced from the threaded portion of the joint, thus avoiding the tendency of the pipe to break at the joint and also preventing leakage around the connection.

Referring to the drawing herewith,

Fig. 1 is a broken longitudinal section through the connection between the pipe and the joint showing the joint after the pipe has been screwed into the socket of the joint.

Fig. 2 is a similar section showing the joint member after it has been upset or peened inwardly at the end to form a supporting engagement with the pipe.

Fig. 3 is a view similar to Fig. 1 but showing the end of the joint member formed with an extension adjacent the pipe which provides metal which may be peened against the pipe by the use of an air hammer.

Fig. 4 is a view similar to Fig. 3 but showing the joint after the peening operation has been finished.

My invention is adapted for use with any ordinary type of tool joint connection. I have shown a pipe member 1 which has uniform wall thickness throughout its length, it being understood however, that the invention is not limited to a pipe of this kind without upset. The end of the pipe is tapered and threaded at 2 for engagement within the threaded socket 3 of the joint member 4. It will be noted that there is no shoulder to be engaged by the pipe as it is threaded within the box.

The box member 4 has the threaded socket 3 to engage with the threaded end of the pipe but an extension 5 is formed upon the joint projecting beyond the threaded area thereof and overlapping the unthreaded portion 6 of the pipe. This overlapping end is spaced slightly from the pipe so as to provide for the insertion of the pipe within the joint member without difficulty.

After the joint members have been screwed tightly together there is a compressive strain exerted by the box member upon a portion of the pipe, this compressive strain terminating at the last engaged thread shown at 7.

I then employ a peening or caulking tool of ordinary construction to peen the metal at the end of the joint inwardly against the unthreaded portion of the pipe. By impact of the tool against the metal the metal is displaced inwardly with force so that the displaced metal contacts forcibly with the pipe at 8 to form a firm supporting engagement between the pipe and the joint member. A shallow groove or trough 10 is thus formed at the end of the joint. A compressive strain is thus exerted against the pipe at the point 8, similar to the compressive strain exerted against the threads and as this area of contact is spaced from the threaded area any flexing or bending of the pipe in use will not be communicated beyond this area of contact to cause fatigue upon the threaded portion. The tendency of the pipe to fracture along the last threads of the threaded portion will hence be removed.

This operation of upsetting the metal of the joint member against the pipe is performed at both ends of the tool joint member 4. The lower portion of the joint forms a shoulder against which elevators employed in raising and lowering the drill stem may engage. In peening the metal at the end of the joint against the pipe a shoulder is left at the joint 9 against which the elevator may contact. This area is somewhat smaller than the normal area at the end of the joint and as wear in the outer surface of the joint occurs this shoulder may be made still thinner. However, it is found that sufficient support may be obtained when the joint is thus recessed at the end along the area 10.

In Figs. 3 and 4 metal is provided at the end of the joint member which may be upset inwardly in such manner that when the joint is complete the shoulder will be approximately radial relative to the pipe. Thus in Fig. 3 the joint member 4' has a projecting lip 11 at the end which when forced inwardly by the impact of the air hammer 12 will close the space at the end of the joint against the pipe so that the metal of the joint will exert a compressive force against the pipe at that point and serve to form a supporting shoulder 8'. When the end of the joint is extended as shown it will be noted in Fig. 4 that the upper end of the joint member will be radial and no recessed portion such as is shown at 10 in Fig. 2 will remain. In this manner a more extensive elevator shoulder 9' will be obtained.

My method of eliminating the strain from the threaded portion of the pipe is easily performed with tools readily at hand and will tend to overcome the tendency of the pipe to fracture at the last engaged thread as is the usual difficulty. The supporting means may thus be easily and economically formed and an efficient and satisfactory connection will be made. An advantage from this methods results from the work hardening of the shoulder formed at the lower end of the joint where the elevator engages. By hammering and upsetting the metal the said metal is materially hardened so that wear is resisted. Thus the joint tends to wear longer without impairing its usefulness in operation.

What I claim is:

In a joint for drill pipe including a pipe section having a threaded engagement with a tool joint member, the process of relieving the lateral strains on the threaded portion of the pipe comprising forming a lip on the end of the tool joint member, said lip extending beyond the threaded portion to overlap the unthreaded portion of the pipe, upsetting the metal at the end of said extending lip of the joint inwardly so as to engage the pipe in firm supporting engagement along a substantial surface about the pipe.

LEOPOLD J. CASTELLANOS.